US012387353B2

United States Patent
Cole et al.

(10) Patent No.: US 12,387,353 B2
(45) Date of Patent: Aug. 12, 2025

(54) MODEL FOR DETERMINING CONSISTENT DEPTH OF MOVING OBJECTS IN VIDEO

(71) Applicant: Google LLC, Mountain View, CA (US)

(72) Inventors: Forrester Cole, Lexington, MA (US); Zhoutong Zhang, Waltham, MA (US); Tali Dekel, Tel-Aviv (IL); William T. Freeman, Acton, MA (US)

(73) Assignee: Google LLC, Mountain View, CA (US)

( * ) Notice: Subject to any disclaimer, the term of this patent is extended or adjusted under 35 U.S.C. 154(b) by 11 days.

(21) Appl. No.: 18/000,928

(22) PCT Filed: Jul. 2, 2021

(86) PCT No.: PCT/US2021/040307
§ 371 (c)(1),
(2) Date: Dec. 6, 2022

(87) PCT Pub. No.: WO2023/277925
PCT Pub. Date: Jan. 5, 2023

(65) Prior Publication Data
US 2024/0242366 A1     Jul. 18, 2024

(51) Int. Cl.
     *G06T 7/20*      (2017.01)
     *G06T 7/55*      (2017.01)

(52) U.S. Cl.
CPC ................ *G06T 7/55* (2017.01); *G06T 7/20* (2013.01); *G06T 2207/10028* (2013.01); *G06T 2207/20084* (2013.01)

(58) Field of Classification Search
CPC ... G06T 7/55; G06T 7/20; G06T 2207/10028; G06T 2207/20084; G06T 2207/10016; G06T 2207/20081
See application file for complete search history.

(56) References Cited

PUBLICATIONS

Chen, Y., Schmid, C., & Sminchisescu, C. (2019). Self-supervised learning with geometric constraints in monocular video: Connecting flow, depth, and camera. In Proceedings of the IEEE/CVF international conference on computer vision (pp. 7063-7072). (Year: 2019).*
Luo, X., Huang, J. B., Szeliski, R., Matzen, K., & Kopf, J. (2020). Consistent video depth estimation. ACM Transactions on Graphics (ToG), 39(4), 71-1. (Year: 2020).*

(Continued)

*Primary Examiner* — Gregory A Morse
*Assistant Examiner* — Renae A Bitor
(74) *Attorney, Agent, or Firm* — McDonnell Boehnen Hulbert & Berghoff LLP

(57) ABSTRACT

A method includes determining, based on a first image, a first depth of a first pixel and, based on a second image, a second depth of a second pixel that corresponds to the first pixel. The method also includes determining a first 3D point based on the first depth and a second 3D point based on the second depth, and determining a scene flow between the first and second images. The method additionally includes determining an induced pixel position based on a post-flow 3D point representing the first 3D point displaced according to the scene flow, determining a flow loss value based on the induced pixel position and a position of the second pixel and a depth loss value based on the post-flow 3D point and the second 3D point, and adjusting the depth model or the scene flow model based on the flow and depth loss values.

20 Claims, 6 Drawing Sheets

(56) References Cited

PUBLICATIONS

Karsch, K., Liu, C., & Kang, S. B. (2014). Depth transfer: Depth extraction from video using non-parametric sampling. IEEE transactions on pattern analysis and machine intelligence, 36(11), 2144-2158. (Year: 2014).*

Luo, C., Yang, Z., Wang, P., Wang, Y., Xu, W., Nevatia, R., & Yuille, A. (2019). Every pixel counts++: Joint learning of geometry and motion with 3d holistic understanding. IEEE transactions on pattern analysis and machine intelligence, 42(10), 2624-2641. (Year: 2019).*

Shi, Y., Zhu, J., Fang, Y., Lien, K., & Gu, J. (2019). Self-supervised learning of depth and ego-motion with differentiable bundle adjustment. arXiv preprint arXiv:1909.13163. (Year: 2019).*

Chen et al., "Self-Supervised Learning With Geometric Constraints in Monocular Video: Connecting Flow, Depth, and Camera," 2019 IEEE/CVF International Conference on Computer Vision, Oct. 27, 2019, pp. 7062-7071.

International Searching Authority, International Search Report and Written Opinion mailed on Apr. 7, 2022, issued in connection with International Patent Application No. PCT/US2021/040307, filed on Jul. 2, 2021, 16 pages.

Luo et al., "Consistent Video Depth Estimation," arXiv:2004.15021v2, Cornell University Library, Aug. 26, 2020, 13 pages.

Luo et al., "Every Pixel Counts ++: Joint Learning of Geometry and Motion with 3D Holistic Understanding," arXiv:1810.06125v2, Jul. 11, 2019, 17 pages.

Zhou et al. "Unsupervised Learning of Depth and Ego-Motion from Video," In Proceedings of the IEEE Conference on Computer Vision and PatternRecognition, 2017, pp. 1851-1858 (arXvi:1704.07813v2).

Casser et al., "Unsupervised Monocular Depth and Ego-motion Learning with Structure Semantics," arXiv:1906.05717v1, Jun. 12, 2019, 8 pages.

Bansal et al., "4d Visualization of Dynamic Events from Unconstrained Multi-View Videos," In Proceedings of the IEEE/CVF Conference on Computer Vision and Pattern Recognition, 2020, pp. 5366-5375.

Barron et al., The Fast Bilateral Solver, In European Conference on Computer Vision, 2016, pp. 617-632.

Basha et al., "Structure and Motion from Scene Registration," In IEEE Conf. Comput. Vis. Pattern Recog. IEEE, 2012, 8 pages.

Basha et al.,. "Multi-view Scene Slow Estimation: A View Centered Variational Approach," Int. J. Comput. Vis., 2013, 16 pages.

Butler et al., "A Naturalistic Open Source Movie for Optical Flow Evaluation," In European Conf. on Computer Vision (ECCV), 2012, pp. 611-625, Part IV, LNCS 7577.

Casser et al., "Depth Prediction Without the Sensors: Leveraging Structure for Unsupervised Learning from Monocular Videos," In AAAI, arXiv:181.06152v1, Nov. 15, 2018, 8 pages.

Chen et al., "Single-Image Depth Perception in the Wild," arXiv:1604.03901v2, Jan. 6, 2017, 14 pages.

Chen et al., Self-supervised Learning with Geometric Constraints in Monocular Video: Connecting Flow, Depth, and Camera, Int. Conf. Comput. Vis. 2019, pp. 7063-7072 (arXiv1907.05820v2).

Dou et al., "Fusion4D: Real-Time Performance Capture of Challenging Scenes," ACM Trans. Graph., 2016, p. 114:1-114:13, vol. 35, No. 4, Article 114.

Eigen et al., "Depth Map Prediction from a Single Image using a Multi-Scale Deep Network," Neural Information Processing Systems, arXiv:1406.2283v1, 2014, 9 pages.

Fu et al., "Deep Ordinal Regression Network for Monocular Depth Estimation," In Proceedings of the IEEE Conference on Computer Vision and Pattern Recognition, 2018, pp. 2002-2011.

Godard et al. "Unsupervised Monocular Depth Estimation with Left-Right Consistency," In Proceedings of the IEEE Conference on Computer Vision and Pattern Recognition, 2017, pp. 270-279.

Godard et al., "Digging into Self-Supervised Monocular Depth Prediction," arXiv:1806:01260v4, 2019, 18 pages.

He et al., "Mask R-CNN," In Proceedings of the IEEE international conference on computer vision. 2017, pp. 2961-2969 (arXiv:1703.06870v3).

Innmann et al., "VolumeDeform: Real-time Volumetric Non-rigid Reconstruction," In Eur. Conf. Comput. Vis., 2016, 17 pages (arXiv:1603.08161v2).

Jensen et al., "A Benchmark and Evaluation of Non-Rigid Structure from Motion," International Journal of Computer Vision, 2021, pp. 882-889, vol. 129.

Klingner et al., "Self-Supervised Monocular Depth Estimation: Solving the Dynamic Object Problem by Semantic Guidance," In European Conference on Computer Vision, 2020, pp. 582-600 (arXiv:2007.06936v2).

Kopf et al., "Robust Consistent Video Depth Estimation," arXiv:2012.05901v2, Jun. 22, 2021, 11 pages.

Li et al., "Learning the Depths of Moving People by Watching Frozen People," In IEEE Conf. Comput. Vis. Pattern Recog., 2019, 10 pages (arXiv:1904.11111v1).

Li et al., Megadepth: Learning Single-View Depth Prediction from Internet Photos, In Proceedings of the IEEE Conference on Computer Vision and Pattern Recognition, 2018, pp. 2041-2050 (arXiv:1804.00607v4).

Li et al., "Neural Scene Flow Fields for Space-Time View Synthesis of Dynamic Scenes," arXiv:2011.13084v3, Apr. 21, 2021, 11 pages.

Lu et al., "Layered Neural Rendering for Retiming People in Video," ACM Trans. Graph., 2020, pp. 256-1-256-14, vol. 39, No. 6, Article 256.

Luo et al., "Consistent Video Depth Estimation," ACM Trans. Graph., 2020, p. 71:1-71-13, vol. 39, No. 4, Article 71 (arXiv:2004.15021v2).

Mildenhall et al., "NeRF: Representing Scenes as Neural Radiance Fields for View Synthesis," In ECCV, arXiv:2003.08934v2, Aug. 3, 2020, 25 pages.

Mur-Artal et al., "ORB-SLAM: A Versatile and Accurate Monocular SLAM System," IEEE Transactions on Robotics, Oct. 2015, pp. 1147-1163, vol. 31, No. 5.

Newcombe et al., "DynamicFusion: Reconstruction and Tracking of Non-rigid Scenes in Real-Time," In IEEE Conf. Comput. Vis. Pattern Recog., 2015, 10 pages.

Niemeyer et al., "Occupancy Flow: 4D Reconstruction by Learning Particle Dynamics," In International Conference on Computer Vision (ICCV), 2019, pp. 5379-5389.

Nuke, The Foundry Visionmongers Ltd., https://www.foundry.com/products/Nuke, 2018, 15 pages.

Park et al., "3D Reconstruction of a Moving Point from a Series of 2D Projections," In European conference on computer vision, Springer, 2010, pp. 158-171.

Park et al., "Nerfies: Deformable Neural Radiance Fields," arXiv:2011.12948v5, Sep. 10, 2021, 18 pages.

Patil et al., "Don't Forget the Past: Recurrent Depth Estimation from Monocular Video," IEEE Robotics and Automation Letters, 2020 pp. 6813-6820, vol. 5, No. 4.

Ranftl et al., "Towards Robust Monocular Depth Estimation: Mixing Datasets for Zero-shot Crossdataset Transfer," IEEE Transactions on Pattern Analysis and Machine Intelligence (TPAMI), 2020, 14 pages.

Ranftl et al., "Dense Monocular Depth Estimation in Complex Dynamic Scenes," In IEEE Conf. Comput. Vis. Pattern Recog., 2016, pp. 4058-4066.

Rematas et al., "Soccer on Your Tabletop," In IEEE Conf. Comput. Vis. Pattern Recog., 2018, 10 pages (arXiv:1806.00890v1).

Richardt et al., Dense wide-baseline scene flow from two handheld video cameras. In 2016 Fourth International Conference on 3D Vision (3DV). IEEE, 2016, pp. 276-285 (arXiv:1609.05115v1).

Russell et al., Video Pop-up: Monocular 3D Reconstruction of Dynamic Scenes, In Eur. Conf. Comput. Vis., 2014, pp. 583-598.

Schönberger et al., "Structure-from-Motion Revisited," In Conference on Computer Vision and Pattern Recognition (CVPR), 2016, 10 pages.

Schönberger et al., "Pixelwise View Selection for Unstructured Multi-View Stereo," In European Conference on Computer Vision (ECCV), 2016, 17 pages.

(56) References Cited

PUBLICATIONS

Seitz et al., "A Comparison and Evaluation of Multi-View Stereo Reconstruction Algorithms," In 2006 IEEE computer society conference on computer vision and pattern recognition (CVPR'06), IEEE, pp. 519-528, vol. 1 (Abstract Only).

Simon et al., "Kronecker-Markov Prior for Dynamic 3D Reconstruction.," IEEE Trans. Pattern Anal. Mach. Intell., 2017, pp. 2201-2214.

Taniai et al., "Fast Multi-frame Stereo Scene Flow with Motion Segmentation," In IEEE Conference on Computer Vision and Pattern Recognition (CVPR), 2017, pp. 6891-6900 (arXiv:1707.01307v1).

Teed et al., Raft: Recurrent All-Pairs Field Transforms for Optical Flow. In European Conference on Computer Vision Springer, 2020, pp. 402-419 (arXiv:2003.12039v3).

Torresani et al., "Nonrigid Structure-from-Motion: Estimating Shape and Motion with Hierarchical Priors," IEEE Transactions on Pattern Analysis and Machine Intelligence, May 2008, pp. 878-892, vol. 30, No. 5.

Vo et al., "Spatiotemporal Bundle Adjustment for Dynamic 3D Reconstruction," In Proceedings of the IEEE Conference on Computer Vision and Pattern Recognition, 2016, pp. 1710-1718.

Wang et al., "Web Stereo Video Supervision for Depth Prediction from Dynamic Scenes," In 2019 International Conference on 3D Vision (3DV), IEEE, 2019, pp. 348-357 (arXiv:1904.11112v1).

Wedel et al., "Stereoscopic Scene Flow Computation for 3D Motion Understanding," Int. J. Comput. Vis., 2011, 32 pages.

Xian et al., "Monocular Relative Depth Perception with Web Stereo Data Supervision," In Proceedings of the IEEE Conference on Computer Vision and Pattern Recognition, 2018, pp. 311-320.

Yang et al., "Every Pixel Counts: Unsupervised Geometry Learning with Holistic 3D Motion Understanding," In Proceedings of the European Conference on Computer Vision (ECCV) Workshops, 2018, 17 pages (arXiv:1706.10556v2).

Yin et al., "Geonet: Unsupervised Learning of Dense Depth, Optical Flow and Camera Pose," In Proceedings of the IEEE Conference on Computer Vision and Pattern Recognition, 2018, pp. 1983-199.

Yoon et al., "Novel View Synthesis of Dynamic Scenes with Globally Coherent Depths from a Monocular Camera," In Proceedings of the IEEE/CVF Conference on Computer Vision and Pattern Recognition, 2020, pp. 5336-5345 (arXiv:2004.01294v1).

\* cited by examiner

| TESTED MODELS | FULL | | | DYNAMIC | | | STATIC | | |
|---|---|---|---|---|---|---|---|---|---|
| | L1 REL. ↓ | LOG RMSE ↓ | RMSE ↓ | L1 REL. ↓ | LOG RMSE ↓ | RMSE ↓ | L1 REL. ↓ | LOG RMSE ↓ | RMSE ↓ |
| MC | 0.5439 | 0.6380 | 4.0960 | 1.0067 | 0.5304 | 1.9503 | 0.4517 | 0.6316 | 4.3739 |
| CVD, MC INIT. | 0.8599 | 0.4675 | 3.6540 | 3.5960 | 0.9164 | 7.9490 | 0.1610 | 0.2425 | 2.4874 |
| DEPTH SYSTEM 300, MC INIT., NO $L^{SF\ VELOCITY}$ | 0.4698 | 0.5072 | 2.9923 | 1.0494 | 0.5637 | 2.0335 | 0.3694 | 0.4755 | 3.1550 |
| DEPTH SYSTEM 300, MC INIT. | 0.4144 | 0.4652 | 2.9724 | 0.9852 | 0.4985 | 1.9479 | 0.3074 | 0.4294 | 3.0742 |
| DEPTH SYSTEM 300, MC INIT., W/ $L^{STATIC}$ | 0.3098 | 0.3337 | 2.6591 | 0.9472 | 0.4681 | 1.9219 | 0.1643 | 0.2318 | 2.4162 |
| MIDAS | 0.4164 | 0.4789 | 3.1480 | 0.8888 | 0.5190 | 1.9712 | 0.3299 | 0.4491 | 3.3275 |
| CVD, MIDAS INIT. | 0.9991 | 0.4882 | 3.9930 | 4.3691 | 0.9793 | 8.2499 | 0.1047 | 0.2025 | 2.4527 |
| DEPTH SYSTEM 300, MIDAS INIT., NO $L^{SF\ VELOCITY}$ | 0.4272 | 0.8584 | 3.1455 | 1.1743 | 0.6400 | 2.6002 | 0.2865 | 0.5438 | 2.7245 |
| DEPTH SYSTEM 300, MIDAS INIT. | 0.3409 | 0.3582 | 2.5845 | 0.7985 | 0.5010 | 1.9208 | 0.2708 | 0.3011 | 2.7196 |
| DEPTH SYSTEM 300, MIDAS INIT., W/ $L^{STATIC}$ | 0.2493 | 0.3314 | 2.3008 | 0.7888 | 0.4879 | 1.8830 | 0.1301 | 0.2419 | 2.2470 |

Figure 6

MODEL FOR DETERMINING CONSISTENT DEPTH OF MOVING OBJECTS IN VIDEO

CROSS-REFERENCE TO RELATED APPLICATIONS

The present application is a National Stage Application under 35 U.S.C. § 371 and claims priority to International Patent Application No. PCT/US2021/040307, filed Jul. 2, 2021, and titled "Model for Determining Consistent Depth of Moving Objects in Video," which is incorporated herein by reference in its entirety.

BACKGROUND

Depth values of features in a three-dimensional environment may be determined by way of triangulation. Triangulation can involve determining the position of a point in three-dimensional space based on that point's projection onto two or more images. The depth of the point may be determined based on a location of the point's projection in each image and the relative position of the camera(s) when capturing each image. When both images are captured in parallel (e.g., by a stereoscopic camera), the depth of both moving and static features of an environment may be determined. However, when images are captured serially, as in the case of a monoscopic camera, movement of features between successive images can make triangulation difficult to apply. Specifically, for a given point on a moving object, it might be difficult to determine whether the apparent displacement of that point between successive images is due to camera motion or due to movement of the object. Accordingly, determining depth for monoscopic images may be difficult.

SUMMARY

A depth model may be pre-trained to generate depth images based on monocular images. The pre-trained depth model may subsequently be fine-tuned to generate, based on monocular images of a video, corresponding depth images that are geometrically and temporally consistent with one another. Fine-tuning of the depth model may be facilitated by a scene flow model configured to generate a scene flow that represents movements over time of 3D points in a scene represented by the video. The 3D points may be generated based on corresponding depth values of the depth images. A depth loss function may be configured to quantify, for a given pair of a first image and a second image, a 3D consistency between (i) post-flow 3D points resulting from displacement of 3D points of the first image according to the corresponding scene flow and (ii) corresponding 3D points of the second image. A pixel flow loss function may be configured to quantify a 2D consistency between (i) induced pixel positions associated with the post-flow 3D points and (ii) corresponding pixel positions indicated by an optical flow between the first image and the second image. Parameters of the scene flow model and the depth model may be adjusted until the generated depth images exhibit a desired level of 3D and/or 2D consistency, as measured by the respective loss functions.

In a first example embodiment, a method may include obtaining a first image from a video, a second image from the video, and an optical flow between the first image and the second image. The method may also include determining that a second pixel of the second image corresponds to a displacement of a first pixel of the first image to the second image according to the optical flow. The method may additionally include determining, by a depth model, (i) a first depth image based on the first image and (ii) a second depth image based on the second image, and determining (i), based on the first depth image, a first depth associated with the first pixel and (ii), based on the second depth image, a second depth associated with the second pixel. The method may yet additionally include determining (i) a first three-dimensional (3D) point based on the first depth associated with the first pixel and (ii) a second 3D point based on the second depth associated with the second pixel. The method may further include determining, by a scene flow model and based on the first 3D point, a scene flow representing a 3D motion of the first 3D point between the first image and the second image, and determining, for the first pixel, an induced pixel position based on a post-flow 3D point that represents the first 3D point after a displacement according to the scene flow. The method may yet further include determining (i) a pixel flow loss value based on a comparison of the induced pixel position to a position of the second pixel and (ii) a depth loss value based on a comparison of the post-flow 3D point to the second 3D point, and adjusting one or more parameters of one or more of the depth model or the scene flow model based on the pixel flow loss value and the depth loss value.

In a second example embodiment, a system may include a processor and a non-transitory computer-readable medium having stored thereon instructions that, when executed by the processor, cause the processor to perform operations in accordance with the first example embodiment.

In a third example embodiments, a non-transitory computer-readable medium may have stored thereon instructions that, when executed by a computing device, cause the computing device to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6 is a table that includes performance metrics for various depth models, in accordance with examples described herein.

DETAILED DESCRIPTION

Figure 1:
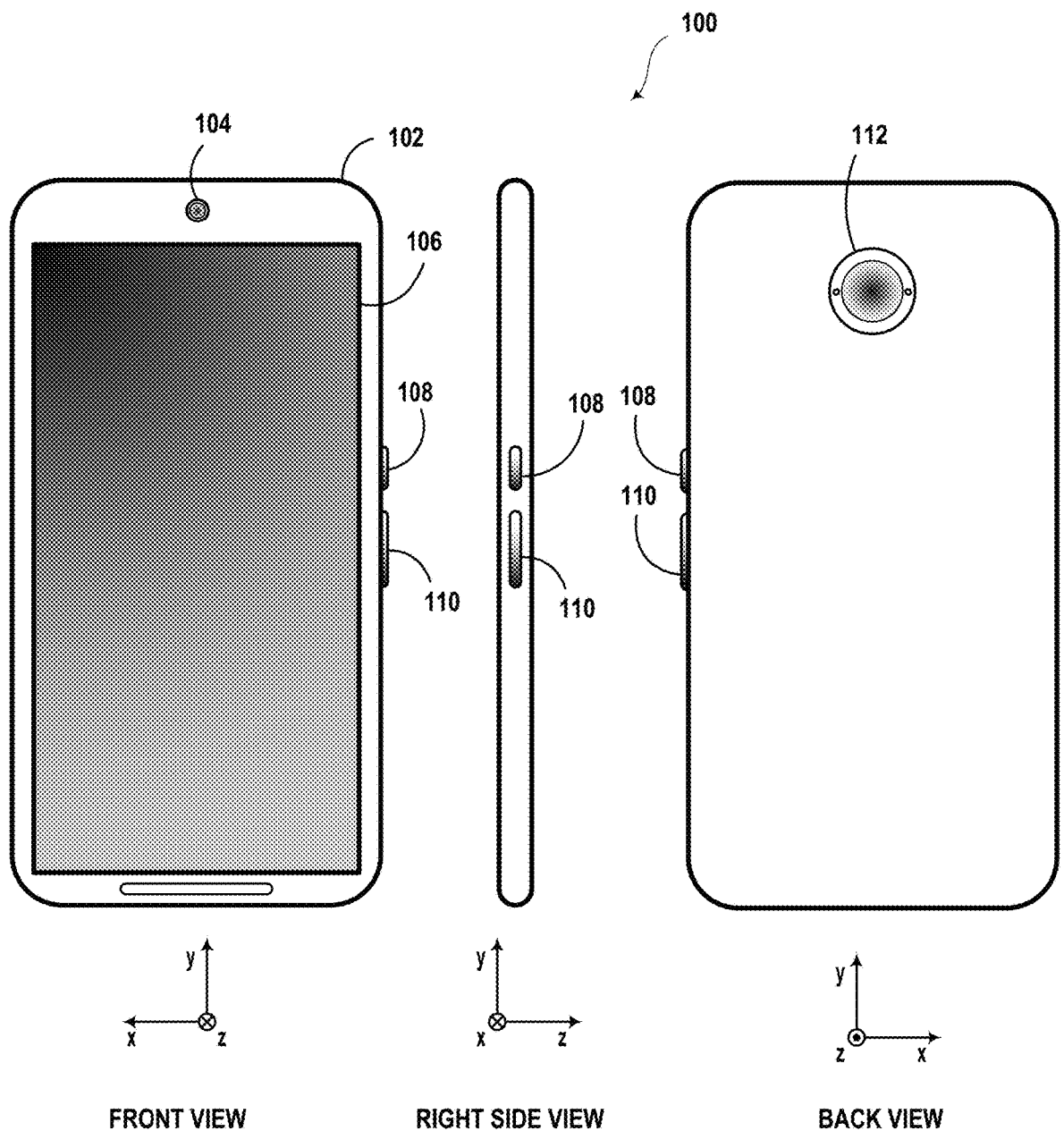
FIG. 1 illustrates a computing device, in accordance with examples described herein.

Example methods, devices, and systems are described herein. It should be understood that the words "example"

and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. Overview

Estimating the geometry of objects in a scene based on monoscopic videos is an under-constrained problem, especially when both the camera and the objects are moving. Specifically, for any moving object, there may be multiple object geometries that satisfy the visual evidence present within the video. For example, an object could be relatively far away from the camera and moving fast, or the object could be relatively close to the camera and moving slowly. Machine learning-based techniques may be configured to solve this problem by learning aspects of the object's motion and/or shape based on training data. For example, a machine learning model may be trained to determine depth images based on monoscopic color images. Such machine learning models may be particularly useful in cases where epipolar geometry constraints are invalid and/or when triangulation-based methods are inapplicable (e.g., for monoscopic videos containing both object and camera motion).

However, some machine learning approaches to depth estimation may be dependent on availability of training data, which might be unavailable for certain types of objects and/or contexts, or which may be inaccurate. Additionally, machine learning models that consider images of a video individually, or consider only a relatively short-range window of images, may generate depth images that include inconsistent depth and/or flickering/jittering over time. Thus, if such depth images are used to apply depth-based effects to the video, the depth inconsistencies and/or depth flickering/jitter may cause commensurate inconsistencies and/or flickering/jitter in the depth-based effects, resulting in these depth-based effects appearing erroneous, inaccurate, and/or otherwise unpleasing to an observer (e.g., a human viewer).

Accordingly, provided herein is a hybrid approach to depth determination in which a pre-trained machine learning model is fine-tuned on a per-video basis to generate geometrically and temporally consistent depth images for a specific video. Specifically, a depth system configured to determine depth images based on images of a video may include a depth model and a scene flow model. The depth model may have been pre-trained to generate depth images based on a training data set that includes pairs of monoscopic images and corresponding ground-truth depth information. The scene flow model may be configured to model a 3D motion of objects in a scene represented by the video, and may thus facilitate depth determination for dynamic (i.e., moving relative to a world reference frame) parts of the scene.

In order to fine-tune the depth model and the scene flow model to a particular video, the depth system may be configured to process and compare different pairs of images from the video. These image pairs may include images separated by various inter-frame distances ranging from, for example, a pair of consecutive images to a pair of images separated by seven intermediate images. By performing the comparison at various different inter-frame distances, the depth system may quantify, and thus improve, depth consistency among various different time scales. For a given pair of images of the video, a pixel correspondence between a first image of the given pair and a second image of the given pair may be determined based on an optical flow between these images.

For a given pair of images of the video, the depth model may be configured to determine a first depth image and a second depth image. Based on these depth images, the depth system may also be configured to unproject at least some of the pixels of each image to generate corresponding 3D points. Specifically, a first set of 3D points may represent, in a world reference frame, the depth associated with pixels of a first image of the given pair, and a second set of 3D points may represent, in the world reference frame, the depth associated with pixels of the second image of the given pair.

The first set of 3D points may be processed by the scene flow model to determine respective displacements of the first set of 3D points from a time associated with the first image to a time associated with the second image. Thus, the scene flow model may provide an explicit 3D representation of motion of features of the scene, may aggregate information over time and space through the parameters of the scene flow model, and may generate plausible scene flows in cases where an analytic solution based on depth and optical flow might be unstable (e.g., nearly parallel rays between two points). Additionally, the scene flow model may be applied recursively to generate a scene flow between non-consecutive time points corresponding to non-consecutive image pairs. The scene flow may be added to the first set of 3D points, thus determining a corresponding set of post-flow 3D points. A depth loss function may be configured to compare each respective 3D point of the post-flow 3D points to a corresponding 3D point of the second set of 3D points, and thereby quantify, by way of a depth loss value, a 3D geometric and temporal consistency between the first depth image and the second depth image.

Additionally, the set of post-flow 3D points may be projected into image space of the second image to determine induced pixel positions associated with the post-flow 3D points (resulting from displacement of the first set of 3D points by the optical flow). A pixel flow loss function may be configured to compare each respective induced pixel position of the induced pixel positions to a corresponding pixel position determined based on the optical flow between the first and second images, and thereby quantify, by way of a pixel flow loss value, a 2D/pixel-space geometric and temporal consistency between the first depth image and the second depth image. Additional loss functions may be used to generate corresponding loss values that quantify performance of the scene flow model and the depth model in other ways. A total loss value for a given training iteration may be based on a sum of the corresponding loss values of a plurality of different image pairs of the video.

Based on the total loss value, the depth system may be configured to adjust parameters of the depth model and/or the scene flow model. For example, the parameters may be adjusted based on a gradient of the loss functions, such that the total loss value of a subsequent training iteration is reduced. Such training iterations may be repeated, for example, until the total loss value is reduced below a threshold loss value. After training, the depth model may be used to generate a plurality of depth images corresponding to images of the video. As a result of the training, these depth images may be relatively more geometrically and temporally consistent with one another and with the scene represented thereby, and such consistency may be present in both the static and moving regions. Accordingly, depth-based effects applied to the video may appear geometrically and temporally consistent, and thus visually coherent and/or pleasing to an observer.

II. Example Computing Devices and Systems

FIG. 1 illustrates an example computing device 100. Computing device 100 is shown in the form factor of a mobile phone. However, computing device 100 may be alternatively implemented as a laptop computer, a tablet computer, and/or a wearable computing device, among other possibilities. Computing device 100 may include various elements, such as body 102, display 106, and buttons 108 and 110. Computing device 100 may further include one or more cameras, such as front-facing camera 104 and rear-facing camera 112.

Front-facing camera 104 may be positioned on a side of body 102 typically facing a user while in operation (e.g., on the same side as display 106). Rear-facing camera 112 may be positioned on a side of body 102 opposite front-facing camera 104. Referring to the cameras as front and rear facing is arbitrary, and computing device 100 may include multiple cameras positioned on various sides of body 102.

Display 106 could represent a cathode ray tube (CRT) display, a light emitting diode (LED) display, a liquid crystal (LCD) display, a plasma display, an organic light emitting diode (OLED) display, or any other type of display known in the art. In some examples, display 106 may display a digital representation of the current image being captured by front-facing camera 104 and/or rear-facing camera 112, an image that could be captured by one or more of these cameras, an image that was recently captured by one or more of these cameras, and/or a modified version of one or more of these images. Thus, display 106 may serve as a viewfinder for the cameras. Display 106 may also support touchscreen functions that may be able to adjust the settings and/or configuration of one or more aspects of computing device 100.

Front-facing camera 104 may include an image sensor and associated optical elements such as lenses. Front-facing camera 104 may offer zoom capabilities or could have a fixed focal length. In other examples, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent, for example, a monoscopic, stereoscopic, or multiscopic camera. Rear-facing camera 112 may be similarly or differently arranged. Additionally, one or more of front-facing camera 104 and/or rear-facing camera 112 may be an array of one or more cameras.

One or more of front-facing camera 104 and/or rear-facing camera 112 may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the examples herein.

Computing device 100 may also include an ambient light sensor that may continuously or from time to time determine the ambient brightness of a scene that cameras 104 and/or 112 can capture. In some implementations, the ambient light sensor can be used to adjust the display brightness of display 106. Additionally, the ambient light sensor may be used to determine an exposure length of one or more of cameras 104 or 112, or to help in this determination.

Computing device 100 could be configured to use display 106 and front-facing camera 104 and/or rear-facing camera 112 to capture images of a target object. The captured images could be a plurality of still images or a video stream. The image capture could be triggered by activating button 108, pressing a softkey on display 106, or by some other mechanism. Depending upon the implementation, the images could be captured automatically at a specific time interval, for example, upon pressing button 108, upon appropriate lighting conditions of the target object, upon moving digital camera device 100 a predetermined distance, or according to a predetermined capture schedule.

Figure 2:
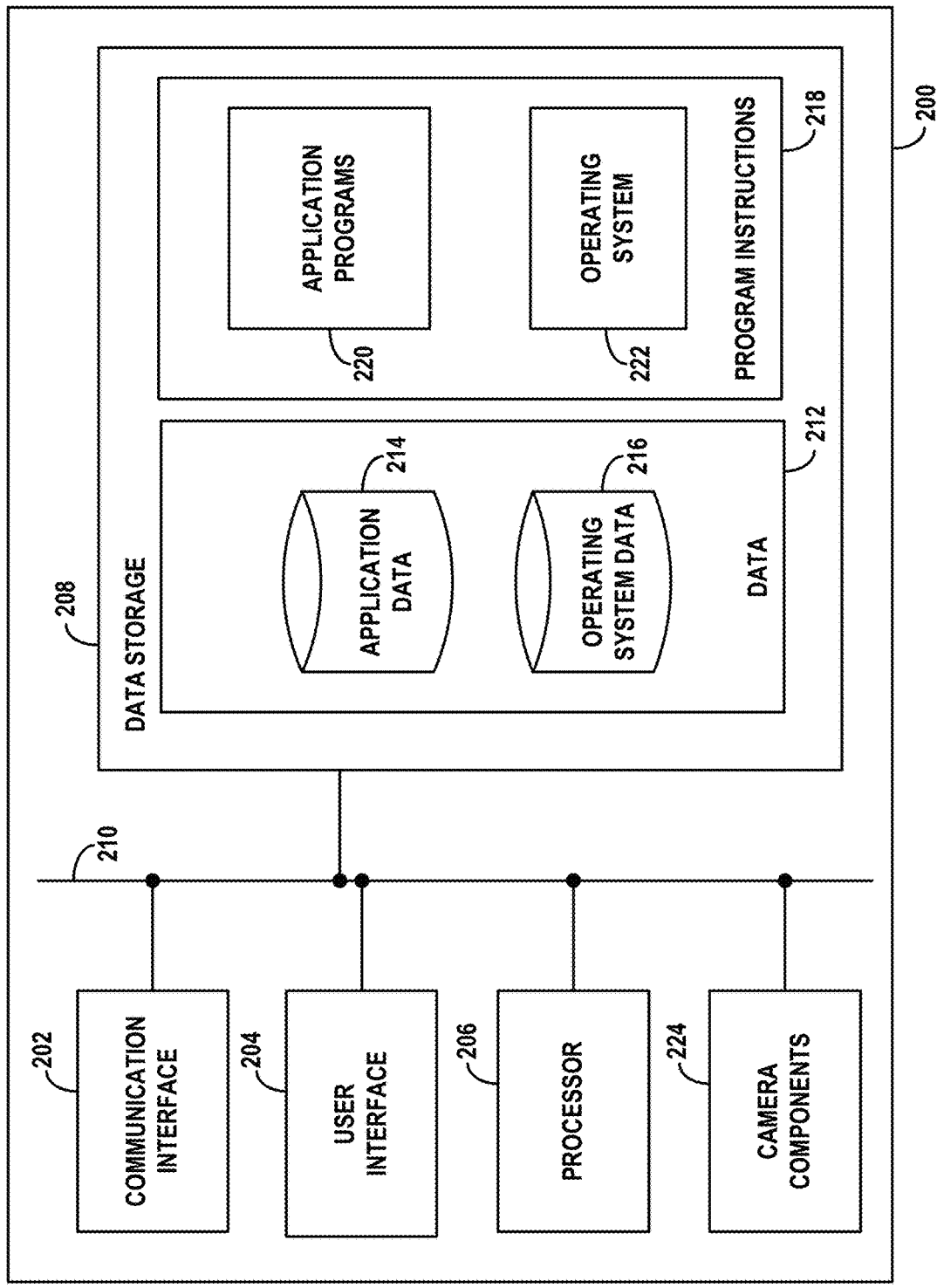
FIG. 2 illustrates a computing system, in accordance with examples described herein.

FIG. 2 is a simplified block diagram showing some of the components of an example computing system 200. By way of example and without limitation, computing system 200 may be a cellular mobile telephone (e.g., a smartphone), a computer (such as a desktop, notebook, tablet, or handheld computer), a home automation component, a digital video recorder (DVR), a digital television, a remote control, a wearable computing device, a gaming console, a robotic device, a vehicle, or some other type of device. Computing system 200 may represent, for example, aspects of computing device 100.

As shown in FIG. 2, computing system 200 may include communication interface 202, user interface 204, processor 206, data storage 208, and camera components 224, all of which may be communicatively linked together by a system bus, network, or other connection mechanism 210. Computing system 200 may be equipped with at least some image capture and/or image processing capabilities. It should be understood that computing system 200 may represent a physical image processing system, a particular physical hardware platform on which an image sensing and/or processing application operates in software, or other combinations of hardware and software that are configured to carry out image capture and/or processing functions.

Communication interface 202 may allow computing system 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wi-Fi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wi-Fi interface, a BLUETOOTH® interface, and a wide-area wireless interface).

User interface 204 may function to allow computing system 200 to interact with a human or non-human user, such as to receive input from a user and to provide output to the user. Thus, user interface 204 may include input components such as a keypad, keyboard, touch-sensitive panel, computer mouse, trackball, joystick, microphone, and so on. User interface 204 may also include one or more output components such as a display screen, which, for example, may be combined with a touch-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices. User interface 204 may also be configured to receive and/or capture audible utterance(s), noise(s), and/or signal(s) by way of a microphone and/or other similar devices.

In some examples, user interface 204 may include a display that serves as a viewfinder for still camera and/or video camera functions supported by computing system 200. Additionally, user interface 204 may include one or more buttons, switches, knobs, and/or dials that facilitate the configuration and focusing of a camera function and the capturing of images. It may be possible that some or all of these buttons, switches, knobs, and/or dials are implemented by way of a touch-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing system 200, cause computing system 200 to carry out any of the methods, processes, or operations disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, audio-to-text functions, text translation functions, and/or gaming applications) installed on computing system 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing system 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some cases, application programs 220 may be referred to as "apps" for short. Additionally, application programs 220 may be downloadable to computing system 200 through one or more online application stores or application markets. However, application programs can also be installed on computing system 200 in other ways, such as via a web browser or through a physical interface (e.g., a USB port) on computing system 200.

Camera components 224 may include, but are not limited to, an aperture, shutter, recording surface (e.g., photographic film and/or an image sensor), lens, shutter button, infrared projectors, and/or visible-light projectors. Camera components 224 may include components configured for capturing of images in the visible-light spectrum (e.g., electromagnetic radiation having a wavelength of 380-700 nanometers) and/or components configured for capturing of images in the infrared light spectrum (e.g., electromagnetic radiation having a wavelength of 701 nanometers-1 millimeter), among other possibilities. Camera components 224 may be controlled at least in part by software executed by processor 206.

Figure 3:
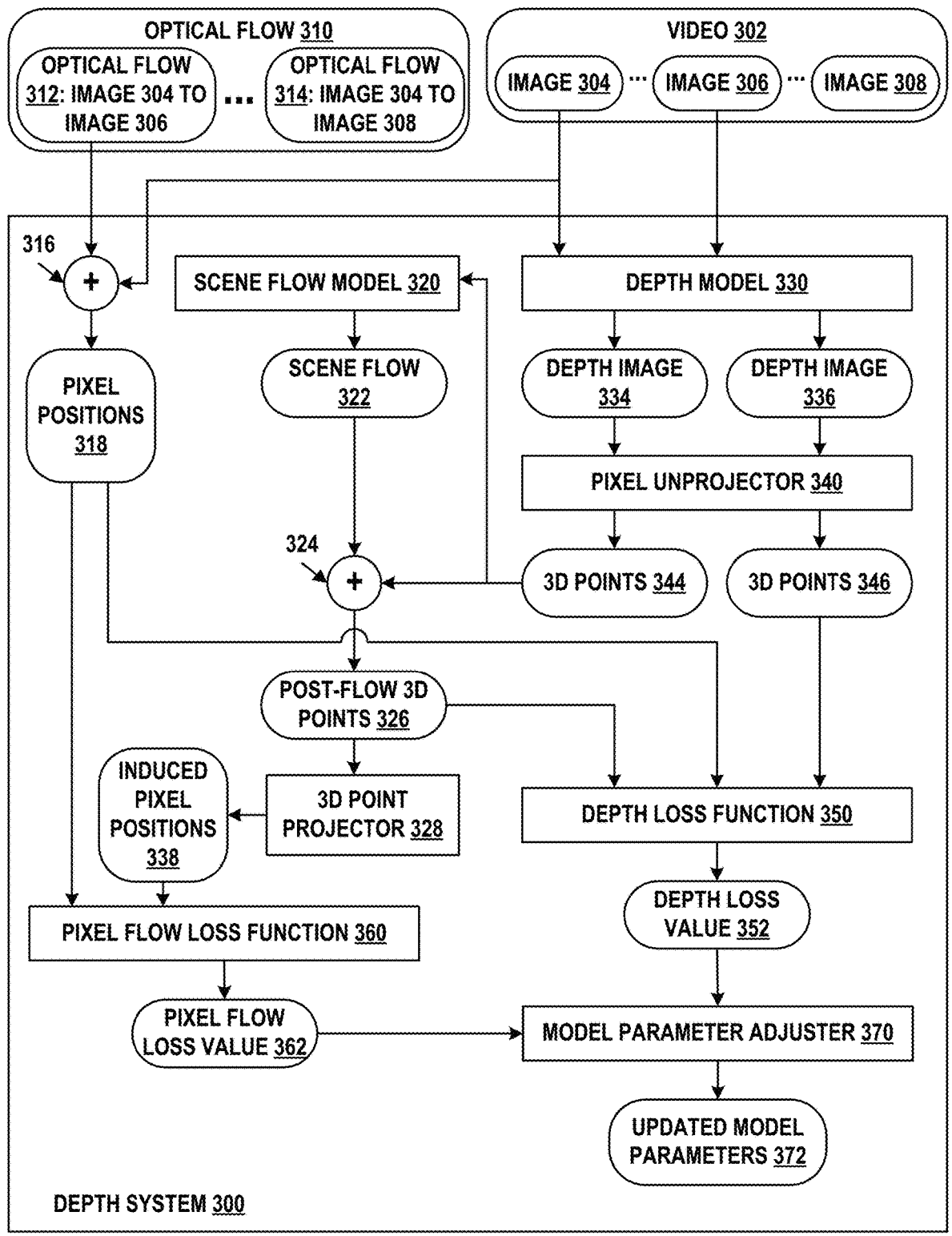
FIG. 3 illustrates a system for determining depth images, in accordance with examples described herein.

III. Example System for Determining Geometrically and Temporally Consistent Depth Images FIG. 3 illustrates an example system for determining geometrically and temporally consistent depth images based on images of a video. Specifically, depth system 300 may include scene flow model 320, 3D point projector 328, depth model 330, pixel unprojector 340, pixel flow loss function 360, depth loss function 350, adder 316, adder 324, and model parameter adjuster 370, among other components. These components of depth system 300 may be implemented as hardware, as software, or as a combination thereof.

Depth system 300 may be configured to determine, for one or more images of video 302, corresponding one or more depth images that are geometrically and temporally consistent. That is, the depth (as represented by the depth images) associated with a given feature of the images may change smoothly and/or in proportion to actual physical motion of the given feature represented across image frames, rather than changing erratically, inconsistently, and/or disproportionally. Thus, when presented as part of a video, the depth represented by the depth images might not appear to jitter, and may thus appear consistent with the actual physical movements of various features over the course of the video.

Video 302 may be, for example, a monoscopic/monocular color video captured by a monoscopic/monocular color camera, and may represent static features and/or moving features. Video 302 may include image 304, image 306, image 308, and zero or more intermediate images, as indicated by the ellipses. Images 304, 306, 308, and the intermediate images may collectively be referred to as images 304-308. Video 302 may be alternatively expressed as V, while images 304-308 may be alternatively expressed as $I_i \in V$, where the index i may indicate a frame number, position, and/or time within video 302.

Optical flow 310 may represent the optical flow between different pairs of images of video 302. For example, optical flow 310 may include optical flow 312 (between image 304 and image 306) through optical flow 314 (between image 304 and image 308), among others. Optical flow 310 may be determined using, for example, the RAFT model, as detailed in a paper titled "RAFT: Recurrent All-Pairs Field Transforms for Optical Flow," authored by Teed et al., and published as arXiv:2003.12039v3. Alternatively or additionally, optical flow 310 may be determined using other models and/or algorithms, such as, for example, the Lucas-Kanade method. In some implementations, optical flow 310 may be determined using a component (not shown) of depth system 300 based on video 302.

In some implementations, optical flow 310 may include, for each respective image of a plurality of images of video 302, a corresponding plurality of optical flows between the respective image and a predetermined sequence (e.g., number and/or position) of subsequent images. For example, the respective image $I_i$ may be associated with corresponding optical flows between image $I_i$ and each of images $I_{i+k}$, $k \in [1, 2, 4, 6, 8]$. Optical flow 310 may include, for each image pair of $I_i$ and $I_{i+k}$ $k \in [1, 2, 4, 6, 8]$, a forward optical flow, which may be expressed as $v_{i \to i+k}$, and/or a backward optical flow, which may be expressed as $v_{i+k \to i}$. For example, optical flow 312 may include a forward flow from image 304 to image 306 and/or a backward flow from image 306 to image 304.

Video 302 may be pre-processed to determine, for each respective image $I_i$ of a plurality of images of video 302, a corresponding set of extrinsic camera parameters $R_i$ and $t_i$, indicative of the rotation and translation, respectively, of the camera relative to a reference frame (e.g., the world frame), and a corresponding set of intrinsic camera parameters $K_i$. For example, camera parameters $R_i$ and $t_i$ may be determined using a simultaneous localization and mapping (SLAM) algorithm/model and/or a structure-from-motion algorithm/model, among other possibilities. In some implementations, a scale of $t_i$ may be aligned to approximately match a scale of initial depth estimates associated with video 302. The pre-processing of video 302 to determine camera parameters $R_i$ and $t_i$ may be performed, for example, by a component (not shown) of depth system 300.

Depth model 330 may be configured to generate, based on image 304 (representing first image $I_i$) of video 302, (first) depth image 334, which may be expressed as $D_i = F_{\theta_D}(I_i)$, where $F_{\theta_D}$ represents the function implemented by depth model 330 and $\theta_D$ represents parameters of depth model 330. Depth model 330 may also be configured to generate, based on image 306 of video 302 (representing second image $I_j$), (second) depth image 336, which may be expressed as $D_j = F_{\theta_D}(I_j)$. Depth model 330 may also be configured to generate other depth images (e.g., $D_{j=i+k}$ $k \in [1, 2, 4, 6, 8]$) based on corresponding other images of video 302, and images 304 and 306 are discussed herein as a representative example. Similarly, other components of depth system 300 may be configured to perform operations based on these other images, such that multiple different i,j pairs may be processed. Depth model 330 may therefore take as input values corresponding to pixels of an input image and output a corresponding depth image indicating depth values associated with each input value.

Depth model 330 may be, for example, a convolutional neural network that has been pre-trained to generate depth images based on monoscopic images. Prior to the training discussed herein, depth images generated by depth model 330 may include geometric and/or temporal inaccuracies and/or inconsistencies. Thus, although depth model 330 may, due to the pre-training, generate depth images that, when considered individually, are at least partially correct, any inaccuracies and/or inconsistencies in these depth images may become visually apparent when the depth images are viewed in a sequence (e.g., as part of a video of the depth images). Thus, depth system 300 may be configured to fine-tune depth model 330 by way of additional training to generate depth images that have improved accuracy and/or consistency.

Pixel unprojector 340 may be configured to determine 3D points corresponding to and representing the depth values associated with pixels of the images in video 302. Specifically, for a first plurality of pixels of image 304, pixel unprojector 340 may be configured to determine corresponding 3D points 344 (i.e., first-image 3D points) and, for a second plurality of pixels of image 306, pixel unprojector 340 may be configured to determine corresponding 3D points 346 (i.e., second-image 3D points). 3D points 344 may be represented in a world reference frame, and 3D points 346 may be represented in the world reference frame or a camera reference frame associated with image 306. The first plurality of pixels may include all or a subset of the pixels of image 304, and the second plurality of pixels may include all or a subset of the pixels of image 306.

3D points 344 may be based on respective depth values of depth image 334, and 3D points 346 may be based on respective depth values of depth image 336. 3D points 344 may be expressed as $X_i(x) = R_i(D_i(x)K_i^{-1}x') + t_i$ (in the world reference frame), where $x \in I_i$ represents coordinates of a respective pixel of the first plurality of pixels of image 304, $D_i(x)$ represents the depth value, as represented by depth image 334, associated with the respective pixel, $R_i$, $t_i$, and $K_i$ represent the camera parameters associated with image 304, and x' represents a 2D homogeneous augmentation of coordinates of the respective pixel. Similarly, 3D points 346 may be expressed as $X_j(x) = R_j(D_j(x)K_j^{-1}x') + t_j$ (in the world reference frame) or as $X_j^{CAMERA}(x) = D_j(x)K_j^{-1}x'$ (in the camera reference frame of image 306), with the index j indicating commensurate values associated with image 306.

Scene flow model 320 may be configured to determine scene flow 322 based on 3D points 344. Scene flow 322 may include, for each respective 3D point of 3D points 344, a corresponding 3D vector indicating a displacement of the respective 3D point from a time (represented by index i) associated with image 304 to a time (represented by index j) associated with image 306. Thus, scene flow model 320 may be configured to model how different parts of a scene represented by video 302 move over time in 3D, and may thus explicitly account for dynamic (i.e., non-static) features of the scene. Scene flow model 320 may be implemented as an artificial neural network, such as, for example, a multi-layer perceptron (MLP), among other possible architectures. Scene flow model 320 may include a positional encoding of the input, and which may be expressed as $\xi(c)=[\sin \pi, \cos \pi c, \sin 2\pi c, \cos 2\pi c, \ldots, \sin N\pi c, \cos N\pi c]$, where $N=16$ for example. The positional encoding $\xi(c)$ may be applied to each element of the input (e.g., the x-coordinate, the y-coordinate, the z-coordinate, and the time i associated with a given 3D point $X_i(x)$ of 3D points 344), resulting in a 128-dimensional vector with 32 dimensions per input element.

In cases where images 304 and 306 are consecutive (i.e., when $j=i+1$), scene flow 322 may be expressed as $S_{i \to i+1}(x) = G_{\theta_S}(X_i(x), i)$, where $G_{\theta_S}$ represents the function implemented by scene flow model 320, $\theta_S$ represents parameters of scene flow model 320, i represents the time associated with depth image 334, and x and $X_i(x)$ are as defined above. In cases where images 304 and 306 are non-consecutive, and thus separated by one or more intermediate images (i.e., when $j-i>1$), scene flow 322 may be determined by applying scene flow model 320 recursively $j-i$ times. This recursive application of scene flow model 320 may be expressed as $S_{i \to j}(x) = G_{\theta_S}(X_{j-1}^*(x), j-1)$, where $X_k^* = X_{k-1} + S_{k-1 \to k}(x)$ for $k=i+1, \ldots, j-1$. Thus, scene flow model 320 may be applied once to 3D points 344, and once to each set of intermediate 3D points that are (i) associated with a corresponding intermediate image of the one or more intermediate images and (ii) representing 3D points 344 at the time associated with the corresponding intermediate image.

For example, when image 304 and image 306 are separated by two intermediate images, scene flow model 320 may be configured to determine a first intermediate scene flow between image 304 and a first intermediate image (consecutive with image 304) based on 3D points 344. 3D points 344 may be displaced according to the first intermediate scene flow, thereby generating first intermediate 3D points corresponding to the first intermediate image. Scene flow model 320 may then be configured to determine a second intermediate scene flow between the first intermediate image and a second intermediate image based on the first intermediate 3D points. The first intermediate 3D points may be displaced according to the second intermediate scene flow, thereby generating second intermediate 3D points corresponding to the second intermediate image. Scene flow model 320 may be configured to determine a third intermediate scene flow between the second intermediate image and image 306 based on the second intermediate 3D points. The second intermediate 3D points may be displaced according to the third intermediate scene flow, thereby generating 3D points (i.e., post-flow 3D points 326) corresponding to the second image. Accordingly, scene flow 322 may be based on a sum of the first intermediate scene flow, the second intermediate scene flow, and the third intermediate scene flow, and may thus represent a 3D motion of 3D points 344 from time i to time j.

Theoretically, scene flow 322 could, instead of being determined by scene flow model 320, be analytically computed based on 2D correspondences (i.e., optical flow) between an image pair and depth images corresponding to the image pair. However, such analytical computation may be noisy and unstable, especially when the camera rays at corresponding points are nearly parallel. Implicitly representing the scene flow using scene flow model 320 may act as an auxiliary variable where the relation to the analytically computed scene flow is encouraged through the loss functions used by depth system 300. Additionally, usage of scene flow model 320 allows the optimization executed by depth system 300 during the course of training to be stable, and thus arrive at a satisfactory depth model 330, which might not be possible using the analytical scene flow computation.

Scene flow 322 may be applied to 3D points 344 to generate post-flow 3D points 326. Specifically, each respective 3D point of 3D points 344 may be displaced according to a corresponding 3D vector of scene flow 322 by adding the corresponding 3D vector to the respective 3D point, as indicated by adder 324. Post-flow 3D points 326 may be represented in the world reference frame. Post-flow 3D points 326 may be expressed as $X_{i \to j}(x) = X_i(x) + S_{i \to j}(x)$. Post-flow 3D points 326 may thus represent the positions of 3D points 344, which were determined based on image 304, at a time corresponding to image 306. Accordingly, a difference between post-flow 3D points 326 and 3D points 346 may be indicative of a consistency of depth images 334 and 336 generated by depth model 330, and may thus be used as a basis for modifying parameters of depth model 330.

In order to quantify a consistency of depth images 334 and 336, depth system 300 may be configured to identify a pixel correspondence between image 304 and image 306. Specifically, adder 316 may be configured to add, to each pixel position of image 304, a corresponding optical flow value of optical flow 312, to thereby determine the pixel correspondence between image 304 and image 306. Pixel correspondences between other image pairs may be determined by adding another corresponding optical flow to pixel coordinates of a first image of a given pair. The pixel correspondences between image 304 and image 306 may be represented by pixel positions 318. Specifically, for each respective pixel of the first plurality of pixels of image 304, pixel positions 318 may indicate a corresponding position within image 306. Pixel positions 318 may thus be expressed as $p_{i \to j}(x) = x + v_{i \to j}(x)$.

3D point projector 328 may be configured to determine induced pixel positions 338 based on post-flow 3D points 326. Specifically, 3D point projector 328 may be configured to project post-flow 3D points 326 from the world reference frame into image space of image 306. Thus, induced pixel positions 338 may provide a 2D representation of post-flow 3D points 326, and thus a representation of the displacement of 3D points 344 caused by scene flow 322. Induced pixel positions 338 may be expressed as $M_j(X_{i \to j}) = \pi(K_j R_j^T(X_{i \to j} - t_j))$, where $\pi$ represents the projection operator $\pi([x, y, w]^T) = [x/w, y/w]^T$.

Since induced pixel positions 338 are based on the output of depth model 330 and scene flow model 320, a comparison of induced pixel positions 338 and pixel positions 318 may be performed to evaluate performance of models 330 and 320. Specifically, pixel flow loss function 360 may be configured to determine pixel flow loss value 362 based on a comparison of induced pixel positions 338 and pixel positions 318. Because pixel positions 318 are based on optical flow, which may have been accurately determined, pixel positions 318 may be considered to function as a ground-truth to which induced pixel positions 338 are compared. Pixel flow loss value 362 may be expressed as $L_{i \to j}^{FLOW}(x) = \|M_j(X_{i \to j}(x)) - p_{i \to j}(x)\|_1$ for a single pixel of image $I_i$, or as $L^{FLOW} = \Sigma_{i,j} \Sigma_x L_{i \to j}^{FLOW}(x)$ for video 302 as a whole, where one or more i,j pairs of images may be compared, and where x may be iterated through the respective first plurality of pixels of each image $I_i$. Pixel flow loss function 360 may alternatively be referred to as a 2D consistency loss function, and may thus be expressed as $L^{2D} = L^{FLOW}$.

In some implementations, depth system 300 may be configured to determine an occlusion mask that corresponds to image 304 and indicates a region thereof that is visible in both image 304 and image 306. For example, the occlusion mask may be determined by comparing (i) the forward optical flow from image 304 to image 306 to (ii) the backward optical flow from image 306 to image 304. Pixel positions may be considered occluded and/or the optical flow may be considered inaccurate where the forward optical flow and the backward optical flow differ by more than a predetermined amount of pixels. For example, the occlusion mask may be expressed as $MO_{i \to i+k}(x)=1$ if $|v_{i \to i+k}(x)+v_{i+k \to i}(x+v_{i \to i+k}(x))|_2 > 1$, or 0 otherwise. Accordingly, in some cases, the first plurality of pixels of image 304 considered by loss functions 350 and/or 360 may be based on the occlusion mask. Thus, pixel flow loss value 362 may alternatively be expressed as $L^{FLOW} = \sum_{i,j} \sum_{x \in \{MO_{i \to j}=0\}} L_{i \to j}^{FLOW}(x)$ That is, pixel flow loss function 360 may be configured to compare induced pixel positions 338 to pixel positions 318 for pixels of image 304 that are unoccluded and/or associated with accurate optical flow.

Further, since post-flow 3D points 326 and 3D points 346 are based on the output of depth model 330 and scene flow model 320, a comparison of post-flow 3D points 326 and 3D points 346 may be performed to evaluate performance of models 330 and 320. Specifically, depth loss function 350 may be configured to determine depth loss value 352 based on a comparison of post-flow 3D points 326 and 3D points 346. In some implementations, depth loss function 350 may be configured to perform the comparison of post-flow 3D points 326 and 3D points 346 in the world reference frame. Accordingly, depth loss value 352 may be expressed as $L_{i \to j}^{DEPTH-1}(x) = \|(X_{i \to j}(x) - X_j(p_{i \to j}(x))\|_1$ for a single pixel of image $I_i$, or as $L^{DEPTH-1} = \sum_{i,j} \sum_x L_{i \to j}^{DEPTH-1}(x)$ for video 302 as a whole, where one or more i,j pairs of images may be compared, and where x may be iterated through the respective first plurality of pixels of each image $I_i$.

In other implementations, depth loss function 350 may be configured to perform the comparison of post-flow 3D points 326 and 3D points 346 in the camera reference frame associated with image $I_j$. Depth loss function may be configured to determine a representation of post-flow 3D points 326 in the camera reference frame associated with image $I_j$, which may be expressed as $X_{i \to j}^{CAMERA\ j}(x) = K_j R_j^T (X_{i \to j}(x) - t_j)$. Accordingly, depth loss value 352 may be expressed as $L_{i \to j}^{DEPTH-2}(x) = \|X_{i \to j}^{CAMERA\ j}(x) - X_j^{CAMERA\ j}(p_{i \to j}(x))\|_1$ for a single pixel of image $I_i$, or as $L^{DEPTH-2} = \sum_{i,j} \sum_x L^{DEPTH-2}(x)$ for video 302 as a whole, where one or more i, j pairs of images may be compared, and where x may be iterated through the respective first plurality of pixels of each image $I_i$.

In further implementations, depth loss function 350 may be configured to compare components of post-flow 3D points 326 and 3D points 346. For example, depth loss function may be configured to determine the depth component of post-flow 3D points 326 (as represented in the camera reference frame associated with image $I_j$), which may be expressed as $D_{i \to j}(x) = |K_j R_j^T (X_{i \to j}(x) - t_j|_z$, where $|\cdot|_z$ denotes taking the depth component of a 3D point, that is, $z = |[x,y,z]|_z$. Accordingly, depth loss value 352 may be expressed as $L_{i \to j}^{DEPTH-3}(x) = \|(1/D_{i \to j}(x)) - (1/D_j(p_{i \to j}(x)))\|_1$ for a single pixel of image $I_i$, or as $L^{DEPTH-3} = \sum_{i,j} \sum_x L^{DEPTH-3}(x)$ for video 302 as a whole, where one or more i,j pairs of images may be compared, and where x may be iterated through the respective first plurality of pixels of each image $I_i$. Accordingly, in cases where depth loss value 352 is based on $D_j(p_{i \to j}(x))$, rather than on $X_j(p_{i \to j}(x))$, depth system 300 might not explicitly determine all components of 3D points 346, and may instead determine $D_j(p_{i \to j}(x))$ directly from depth image 336.

Further, in some cases, $L^{DEPTH-1}$, $L^{DEPTH-2}$, and/or $L^{DEPTH-3}$ may be computed based on pixels of image $I_i$ that are unoccluded and/or associated with accurate optical flow, that is, $x \in \{MO_{i \to j}=0\}$, as discussed above. Depth loss function 350 may alternatively be referred to as a disparity consistency loss function, or a 3D consistency loss function, and may thus be expressed as $L^{DISPARITY} = L^{DEPTH}$ or $L^{3D} = L^{DEPTH}$, where $L^{DEPTH}$ may represent any of the variations of depth loss function 350 discussed above.

In some implementations, depth system 300 may also be configured to determine additional loss values that may be used in training of scene flow model 320 and/or depth model 330. In one example, depth system may be configured to determine a scene flow velocity loss value $L_i^{SF\ VELOCITY}$ using a scene flow velocity loss function, which may be expressed as $L_i^{SF\ VELOCITY}(x) = \|S_{i \to i+1}(x) - G_{\theta_S}(X_i(x) + S_{i \to i+1}(x), i+1)\|_1$ for a single pixel of image $I_i$, or as $L^{SF\ VELOCITY} = \sum_i \sum_{x \in I_i} L_i^{SF\ VELOCITY}(x)$ for video 302 as a whole, where i may be iterated through at least a subset of video 302. The scene flow velocity loss function may be configured to compare (i) a first scene flow determined between images $I_i$ and $I_{i+1}$ based on the 3D points corresponding to images $I_i$ to (ii) a second scene flow determined between images $I_{i+1}$ and $I_{i+2}$ based on the post-flow 3D points of image $I_i$ resulting displacement of the 3D points of image $I_i$ according to the first scene flow. Thus, the scene flow velocity loss function may incentivize scene flow model 320 to generate scene flows that, for a given point, do not change significantly between consecutive frames, and thus indicate that a corresponding feature moves at an approximately constant velocity.

In another example, depth system may be configured to determine a static region loss value $L_i^{STATIC}$ using a static region loss function. The static region loss value $L_i^{STATIC}$ may be based on a static region mask $MS_i$ that indicates regions and/or features of image $I_i$ that do not move relative to the world reference frame over time. The static region loss function may be expressed as $L_i^{STATIC}(x) = \|S_{i \to i+1}(x)\|_1$ for a single pixel of image $I_i$, or as $L^{STATIC} = \sum_i \sum_{x \in MS_i} L_i^{STATIC}(x)$ for video 302 as a whole, where i may be iterated through at least a subset of video 302. Thus, the static region loss function may incentivize scene flow model 320 to generate scene flows that tend to zero for static regions and/or features, since these regions and/or features are not expected to move relative to the world reference frame.

While the L-1 norm is used for the loss functions discussed herein, it is to be understood that other norms, such as the L-2 norm, may be used in place of the L-1 norm. For some of the loss functions, some norms may result in models 320 and/or 330 being trained to generate more accurate and/or more consistent (e.g., geometrically and/or temporally) depth images. An appropriate norm may be selected empirically as part of the training process.

Model parameter adjuster 370 may be configured to determine updated model parameters 372 based on pixel flow loss value 362, depth loss value 352, and any other loss values determined by depth system 300. Model parameter adjuster 370 may be configured to determine a total loss value based on a weighted sum of the loss values, which may be expressed as $L^{TOTAL} = L^{FLOW} + \alpha L^{DEPTH} + \beta L^{SF\ VELOCITY} + \gamma L^{STATIC}$, where $L^{DEPTH}$ may be any one of $L^{DEPTH-1}$, $L^{DEPTH-2}$, or $L^{DEPTH-3}$, and where the values of $\alpha$, $\beta$, and $\gamma$ represent the relative weight of the corresponding loss values (e.g., $\alpha=0.1$, $\beta=1$, and $\gamma=100$). Updated model parameters 372 may include one or more updated parameters of scene flow model 320, which may be expressed as $\Delta\theta_S$, and/or one or more updated parameters of depth model 330, which may be expressed as $\Delta\theta_D$.

Model parameter adjuster 370 may be configured to determine updated model parameters 372 by, for example, determining a gradient of the total loss function $L^{TOTAL}$. Based on this gradient and the total loss value, model parameter adjuster 370 may be configured to select updated model parameters 372 that are expected to reduce the total loss value, and thus improve performance of depth system 300. After applying updated model parameters 372 to scene flow model 320 and/or depth model 330, the operations discussed above may be repeated to compute another instance of the total loss value and, based thereon, another instance of updated model parameters 372 may be determined and applied to models 320 and 330 to further improve the performance thereof. Such training of models 320 and 330 may be repeated until, for example, the total loss value is reduced to below a target threshold loss value.

In some implementations, depth model 330 may be pre-trained using, for example, a data set that includes pairs of monoscopic images and corresponding ground-truth depth images, while scene flow model 320 may be randomly initialized. Thus, depth model 330 may be expected to generate outputs that, due to the pre-training, are reasonably accurate (albeit temporally and/or geometrically inconsistent across image frames), while scene flow model 320 may be expected to generate outputs that are inaccurate due to the random initialization. Thus, for a predetermined number of initial training iterations, parameters of depth model 330 may be kept constant, while parameters of scene flow model 320 may be modified. Thus, during the initial training iterations, scene flow model 320 may be trained to coordinate with depth model 330 without allowing the random initialization of scene flow model 320 to cause depth model 330 to inadvertently "unlearn" information that is actually useful in depth determination. During subsequent training iterations, parameters of both depth model 330 and scene flow model 320 may be modified to allow both models to be fine-tuned to video 302.

Once models 320 and 330 are trained, depth model 330 may be used to process images of video 302 and generate corresponding depth images. As a result of training, these depth images may have improved geometric and/or temporal consistency, at least relative to depth images that would be generated by depth model 330 prior to training by depth system 300. Scene flow model 320 may be used during training, but might not be used during the final inference pass following completion of training, since, at least in some cases, the output thereof might not be useful outside of training. Additionally, following training, depth model 330 and scene flow model 320 may be specific to video 302 in that depth model 330 may be configured to generate geometrically and temporally consistent depth images based on images of video 302, but might not perform as accurately with respect to other videos. Thus, in order to generate geometrically and temporally accurate depth images for another video, depth system 300 may be configured to retrain models 320 and 330 based on images of this other video using the process discussed above.

The depth images generated for a particular video using the trained depth model may be used to apply one or more depth-based modifications to the video. In one example, the depth images may be used to insert an object into the video in a depth-aware manner and, due to the geometric and temporal consistency, the object may appear at a consistent position in the world reference frame across image frames. In another example, the depth images may be used to alter the lighting of the video and/or apply lighting-based effects to the video and, due to the geometric and temporal consistency, the lighting may appear to change consistently with the object and/or camera motion across image frames. Other depth-based effects are possible.

IV. Example Geometric View of the Pixel Flow Loss and the Depth Loss

Figure 4:
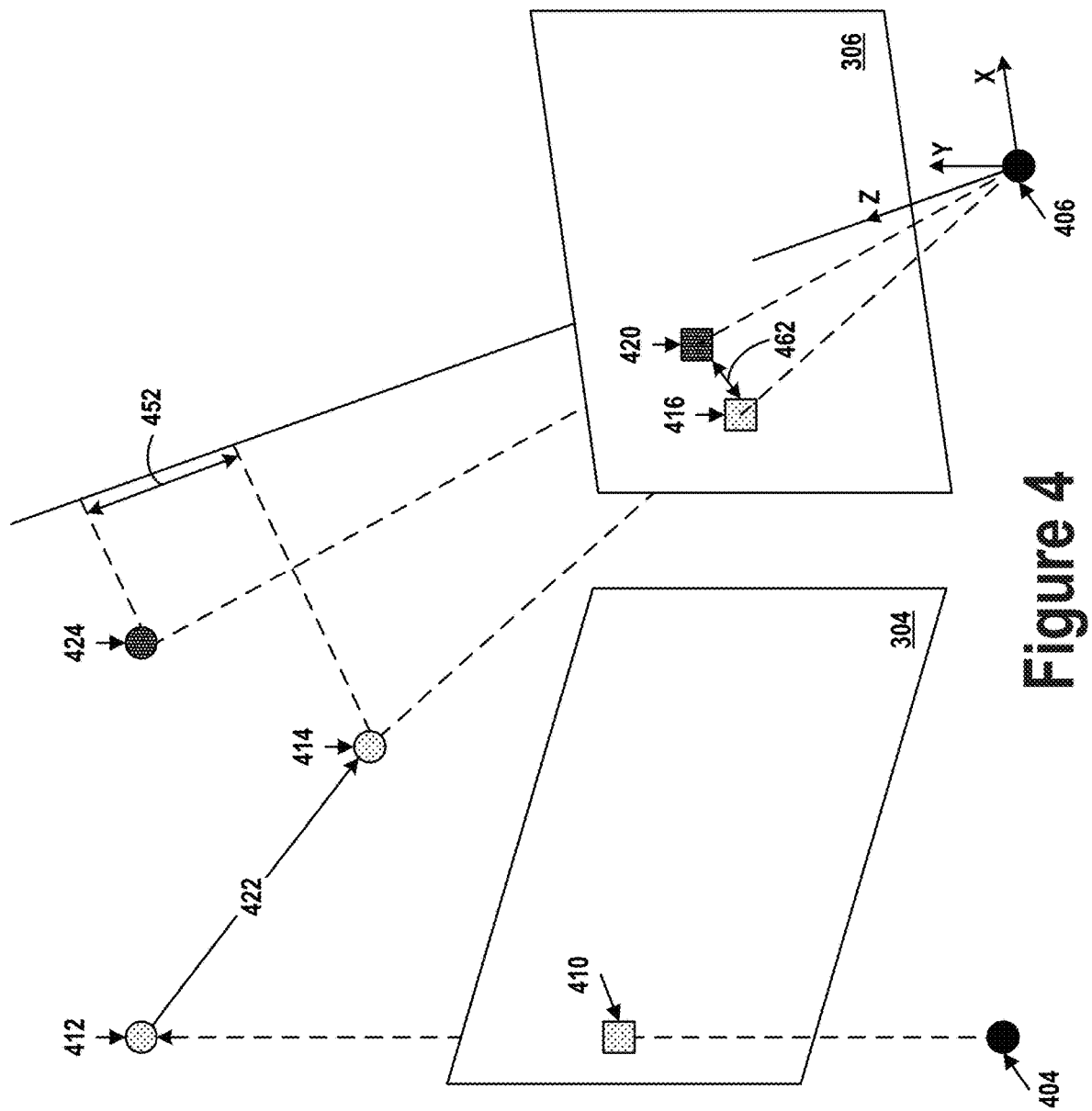
FIG. 4 illustrates a geometric representation of aspects of loss values, in accordance with examples described herein.

FIG. 4 illustrates a geometric representation of aspects of the computation of pixel flow loss value 362 and depth loss value 352. Specifically, FIG. 4 includes image 304, image 306, camera reference frame 404 associated with image 304, and camera reference frame 406 associated with image 306. Pixel 410 is a representative example of the first plurality of pixels considered as part of the computation of the loss values. For example, pixel 410 may be located within an unoccluded portion of the occlusion mask associated with image 304.

When a corresponding optical flow value of optical flow 316 is added to coordinates of pixel 410, the resulting coordinates may be represented by pixel 420 in image 306. Thus, pixel 420 corresponds to one of pixel positions 318. Additionally, pixels 410 and 420 may be expected to represent approximately the same feature of the scene, albeit in different images. Pixel 420 is a representative example of the second plurality of pixels considered as part of the computation of the loss values.

Pixel 410 may be associated with a corresponding depth value represented by a corresponding pixel in depth image 334. Based on this corresponding depth value, pixel 410 may be unprojected (or backprojected) by pixel unprojector 340 to generate 3D point 412, which may represent one of 3D points 344. Similarly, pixel 420 may be associated with a corresponding depth value represented by a corresponding pixel in depth image 336. Based on this corresponding depth value, pixel 420 may be unprojected (or backprojected) by pixel unprojector 340 to generate 3D point 424, which may represent one of 3D points 346.

3D point 412 may be displaced according to scene flow vector 422 to generate 3D point 414. Scene flow vector 422 may be one of a plurality of vectors represented by scene flow 322. 3D point 414 may be one of post-flow 3D points 326. 3D point 414 may be projected into the image space of image 306 by 3D point projector 328 to determine pixel 416, which may represent one of induced pixel positions 338.

Arrow 462 between pixel 416 and pixel 420 provides a visual representation of the contribution of pixel 410 to pixel flow loss value 362. Specifically, the loss contributed by pixel 410 to pixel flow loss value 362 is based on a distance (e.g., L-1 norm, L-2 norm, etc.) between pixel 416 and pixel 420. The distance between pixel 416 and pixel 420 represents the difference between a pixel position resulting from optical flow 312 and a pixel position resulting from scene flow 322.

Arrow 452 between the z-axis projection of 3D point 414 and the z-axis projection of 3D point 424 provides a visual representation of the contribution of pixel 410 to depth loss value 352. Specifically, the loss contributed by pixel 410 to depth loss value 352 is based on a distance (e.g., L-1 norm, L-2 norm, etc., or a component thereof) between 3D point 414 and 3D point 424.

V. Additional Example Operations

Figure 5:
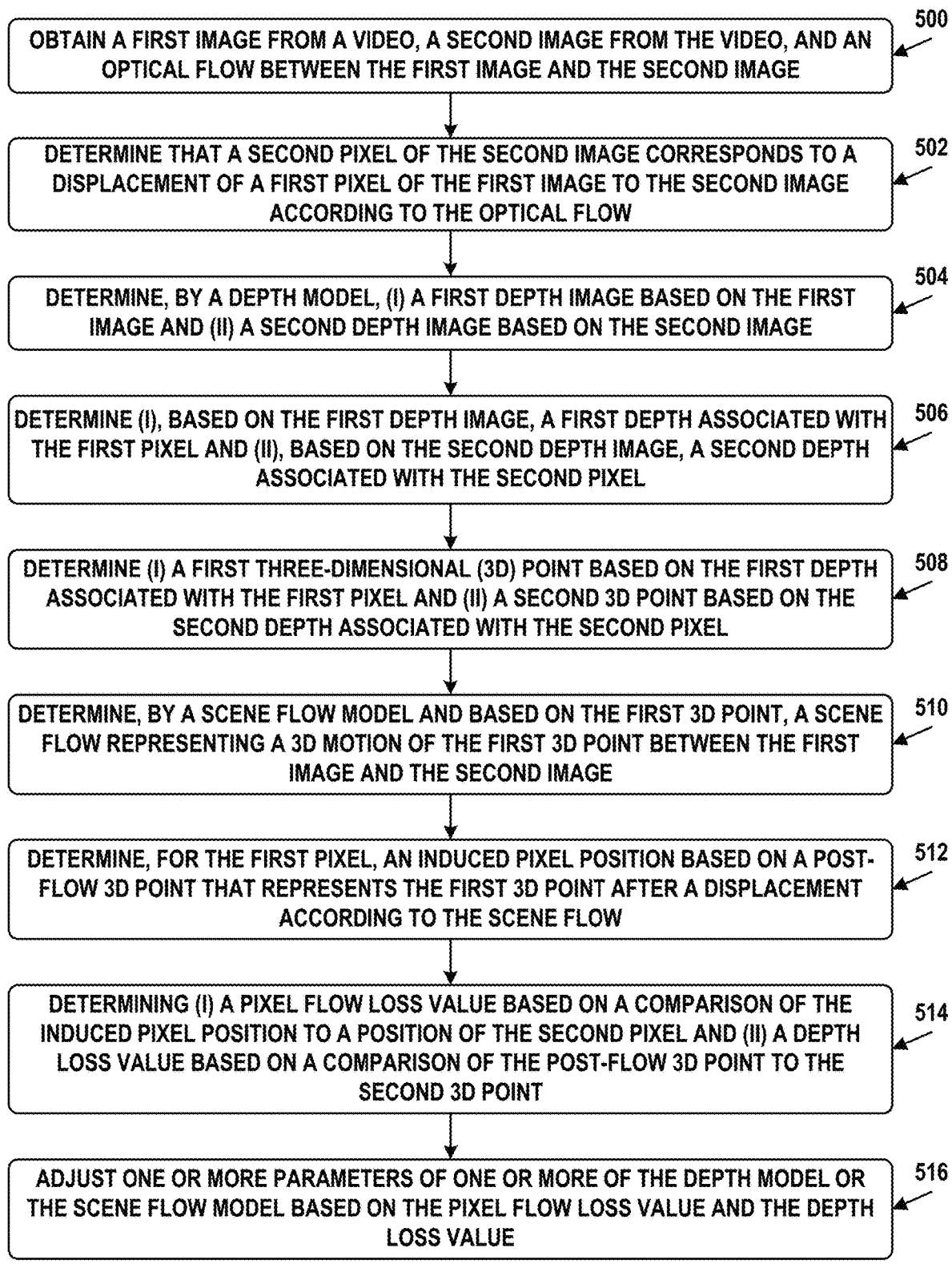
FIG. 5 is a flow chart, in accordance with examples described herein.

FIG. 5 illustrates a flow chart of operations related to determining geometrically and temporally consistent depth images based on a video. The operations may be carried out by computing device 100, computing system 200, and/or depth system 300, among other possibilities. The embodiments of FIG. 5 may be simplified by the removal of any one or more of the features shown therein. Further, these embodiments may be combined with features, aspects, and/or implementations of any of the previous figures or otherwise described herein.

Block 500 may involve obtaining a first image from a video, a second image from the video, and an optical flow between the first image and the second image.

Block 502 may involve determining that a second pixel of the second image corresponds to a displacement of a first pixel of the first image to the second image according to the optical flow.

Block 504 may involve determining, by a depth model, (i) a first depth image based on the first image and (ii) a second depth image based on the second image.

Block 506 may involve determining (i), based on the first depth image, a first depth associated with the first pixel and (ii), based on the second depth image, a second depth associated with the second pixel.

Block 508 may involve determining (i) a first three-dimensional (3D) point based on the first depth associated with the first pixel and (ii) a second 3D point based on the second depth associated with the second pixel.

Block 510 may involve determining, by a scene flow model and based on the first 3D point, a scene flow representing a 3D motion of the first 3D point between the first image and the second image.

Block 512 may involve determining, for the first pixel, an induced pixel position based on a post-flow 3D point that represents the first 3D point after a displacement according to the scene flow.

Block 514 may involve determining (i) a pixel flow loss value based on a comparison of the induced pixel position to a position of the second pixel and (ii) a depth loss value based on a comparison of the post-flow 3D point to the second 3D point.

Block 516 may involve adjusting one or more parameters of one or more of the depth model or the scene flow model based on the pixel flow loss value and the depth loss value.

In some embodiments, the pixel flow loss value and the depth loss value may represent an extent of temporal consistency between the first depth image and the second depth image. After adjusting the one or more parameters, the depth model may be configured to generate, based on images in the video, depth images with improved temporal consistency. The depth model and the scene flow model may be specific to the video.

In some embodiments, determining the induced pixel position may include determining a projection of the post-flow 3D point into an image space of the second image.

In some embodiments, determining the depth loss value may include determining a representation of the post-flow 3D point in a reference frame associated with the second image. The second 3D point may be represented in the reference frame associated with the second image. Determining the depth loss value may also include determining (i) a first depth component of the representation of the post-flow 3D point and (ii) a second depth component of the second 3D point, and determining the depth loss value based on a comparison of the first depth component and the second depth component.

In some embodiments, determining the depth loss value may include determining a difference between (i) an inverse of the first depth component and (ii) an inverse of the second depth component.

In some embodiments, the second pixel of the second image may be one of a second plurality of pixels of the second image. Each respective pixel of the second plurality of pixels may correspond to a pixel of a first plurality of pixels of the first image. The second plurality of pixels may be determined based on a displacement of the first plurality of pixels from the first image to the second image according to the optical flow. The first 3D point may be one of a plurality of first-image 3D points corresponding to the first plurality of pixels. Each respective first-image 3D point of the plurality of first-image 3D points may be determined based on a respective depth associated with a corresponding pixel of the first plurality of pixels according to the first depth image. The second 3D point may be one of a plurality of second-image 3D points corresponding to the second plurality of pixels. Each respective second-image 3D point of the plurality of second-image 3D points may be determined based on a respective depth associated with a corresponding pixel of the second plurality of pixels according to the second depth image. The post-flow 3D point may be one of a plurality of post-flow 3D points. Each respective post-flow 3D point of the plurality of post-flow 3D points may represent a corresponding first-image 3D point after a corresponding displacement according to the scene flow.

In some embodiments, determining the depth loss value may include performing, for each respective pixel of the first plurality of pixels, a comparison of the corresponding post-flow 3D point to the corresponding second-image 3D point.

In some embodiments, determining the induced pixel position may include determining, for each respective pixel of the first plurality of pixels, a corresponding induced pixel position based on the corresponding post-flow 3D point. Determining the pixel flow loss value may include performing, for each respective pixel of the first plurality of pixels, a comparison of the corresponding induced pixel position to a position of the corresponding pixel of the second plurality of pixels.

In some embodiments, an occlusion mask corresponding to the first image and indicating an unoccluded region of the first image that is visible in the first image and in the second image may be determined. The first pixel may be selected from the unoccluded region of the first image based on the occlusion mask.

In some embodiments, the depth model may include a convolutional neural network that has been pre-trained to generate depth images using a training data set that includes a plurality of pairs of (i) a respective monoscopic training image and (ii) a corresponding ground-truth depth image.

In some embodiments, the scene flow model may include a multi-layer perceptron that has been randomly initialized.

In some embodiments, the scene flow model may be configured to receive as input (i) 3D coordinates representing a given 3D point in a world reference frame and (ii) a time value associated with a particular depth image on which the given 3D point is based. The scene flow model may be configured to determine, for the given 3D point and the time value, a corresponding vector representing a displacement of the given 3D point from the respective time value to a time value subsequent thereto.

In some embodiments, a plurality of training iterations may be performed. Each respective training iteration of the plurality of training iterations may include determining respective instances of the first depth image, the second depth image, the first depth, the second depth, the scene flow, the first 3D point, the second 3D point, the post-flow 3D point, the induced pixel position, the pixel flow loss value, and the depth loss value. During an initial sequence of training iterations of the plurality of training iterations, one or more parameters of the scene flow model may be adjusted while parameters of the depth model may be kept constant. During a subsequent sequence of training iterations of the plurality of training iterations, one or more parameters of the scene flow model may be adjusted and one or more parameters of the depth model may be adjusted.

In some embodiments, the scene flow may be a first scene flow. The second image may be subsequent to and consecutive with the first image. A third image of the video may be subsequent to and consecutive with the second image. A second scene flow may be determined by the scene flow model and based on the post-flow 3D point. The second scene flow may represent an additional 3D motion of the post-flow 3D point between the second image and the third image. A scene flow velocity loss value may be determined based on a comparison of the first scene flow and the second scene flow. The one or more parameters may be adjusted further based on the scene flow velocity loss value.

In some embodiments, a static region mask may be determined. The static region mask may correspond to the first image and may indicate a static region of the first image that does not move relative to a world reference frame. A static region loss value may be determined based on scene flow values associated with the static region of the first image. The one or more parameters may be adjusted further based on the static region loss value.

In some embodiments, the second image may be subsequent to and consecutive with the first image. A third image may be obtained from the video and an additional optical flow between the first image and the third image may be obtained. The third image may be separated from the first image by one or more intermediate images of the video. It may be determined that a third pixel of the third image corresponds to a displacement of the first pixel from the first image to the third image according to the additional optical flow. A third depth image may be determined by the depth model based on the third image. A third depth associated with the third pixel may be determined based on the third depth image. A third 3D point may be determined based on the third depth associated with the third pixel. An additional scene flow representing a 3D motion of the first 3D point between the first image and the third image may be determined by the scene flow model. An additional induced pixel position may be determined for the first pixel based on an additional post-flow 3D point that represents the first 3D point after an additional displacement according to the additional scene flow. The pixel flow loss value may be determined further based on a comparison of the additional induced pixel position to a position of the third pixel. The depth loss value may be determined further based on a comparison of the additional post-flow 3D point to the third 3D point.

In some embodiments, determining the additional scene flow may include determining, for each respective intermediate image of the one or more intermediate images that separate the third image from the first image, a corresponding intermediate post-flow 3D point that represents the first 3D point after one or more displacements according to one or more preceding scene flows determined for one or more preceding images. Determining the additional scene flow may also include determining, by the scene flow model and for each respective intermediate image, a corresponding scene flow based on the corresponding intermediate post-flow 3D point, and determining the additional scene flow based on a sum of the corresponding scene flow of each respective intermediate image of the one or more intermediate images.

In some embodiments, first camera parameters associated with the first image and second camera parameters associated with the second image may be determined based on the video. The first 3D point may be determined based on the first camera parameters. The second 3D point and the induced pixel position may each be determined based on the second camera parameters.

In some embodiments, after adjusting the one or more parameters, a plurality of depth images based on a corresponding plurality of images of the video may be determined by the depth model. Based on the plurality of depth images, one or more images of the corresponding plurality of images may be modified to insert a depth-based effect into the video.

VI. Example Performance Metrics

FIG. 6 includes a table that shows various performance metrics for a plurality of different depth models tested on a subset of the Sintel data set, which is detailed in a paper titled "A Naturalistic Open Source Movie for Optical Flow Evaluation," authored by Butler et al., and published at the 2012 European Conference on Computer Vision. L-1 relative error (L1 REL.), log root mean square error (LOG RMSE), and RMSE of the determined depth images relative to the ground-truth are shown as measured for (i) the entire area of each of the tested Sintel data set images ("Full"), (ii) dynamic (i.e., moving relative to the world reference frame) regions of these images ("Dynamic"), and (iii) static regions of these images ("Static"). Lower numbers indicate better performance, as indicated by the downward arrows.

Regarding the specific tested models, "MC" in rows 600, 602, 604, 606, and 608 indicates a version of depth model 330 that has been pre-trained (i.e., initialized) using the techniques and data set described in a paper titled "Learning the Depths of Moving People by Watching Frozen People," authored by Li et al., and published as arXiv:1904.11111v1. "MIDAS" in rows 610, 612, 614, 616, and 618 indicates a version of depth model 330 that has been pre-trained using the techniques and data set described in a paper titled "Towards Robust Monocular Depth Estimation: Mixing Datasets for Zero-shot Cross-dataset Transfer," authored by Ranftl et al., and published as arXiv:1907.01341v3. "CVD" in rows 602 and 612 indicates a version of depth model 330 that has been additionally trained (i.e., fine-tuned) using the techniques described in a paper titled "Consistent Video Depth Estimation," authored by Luo et al., and published as arXiv:2004.15021v2.

"Depth system 300" in rows 614, 606, 608, 614, 616, and 618 indicates a version of depth model 330 that has been additionally trained (i.e., fine-tuned) using the techniques discussed herein. Specifically, "No $L^{SF\ VELOCITY}$" in rows 604 and 614 indicate that depth model 330 has been trained using only pixel flow loss function 360 and depth loss function 350 (i.e., without using scene flow velocity loss). Rows 606 and 616 indicate that depth model 330 has been trained using pixel flow loss function 360, depth loss function 350, and the scene flow velocity loss function. "W/$L^{STATIC}$" in rows 608 and 618 indicate that depth model 330 was trained using pixel flow loss function 360, depth loss function 350, the scene flow velocity loss function, and the static region loss function.

For a given model initialization, the best result for a given performance metric is indicated by a pattern-filled cell, and the second best result is indicated with an underline. Many of the variations of depth system 300, detailed in rows 604, 606, 608, 614, 616, and 618, improve upon the results produced by the corresponding initial pre-trained depth model, detailed in rows 600 and 618. Further, many of the variations of depth system 300 outperform CVD (which assumes a static scene) with respect to the full scene and dynamic portions of the full scene, and some perform very closely with CVD in static portions of the full scene. In general, the addition of the scene flow velocity loss function and the static region loss function improve performance of depth model 330.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:
1. A computer-implemented method comprising:
obtaining a first image from a video, a second image from the video, and an optical flow between the first image and the second image;
determining that a second pixel of the second image corresponds to a displacement of a first pixel of the first image to the second image according to the optical flow;
determining, by a depth model, (i) a first depth image based on the first image and (ii) a second depth image based on the second image;
determining (i), based on the first depth image, a first depth associated with the first pixel and (ii), based on the second depth image, a second depth associated with the second pixel;
determining (i) a first three-dimensional (3D) point based on the first depth associated with the first pixel and (ii) a second 3D point based on the second depth associated with the second pixel;
determining, by a scene flow model comprising a neural network and based on the first 3D point, a scene flow representing a 3D motion of the first 3D point between the first image and the second image, wherein determining the scene flow comprises: (i) providing a representation of coordinates of the first 3D point as input to the neural network, (ii) processing the representation of the coordinates of the first 3D point by the neural network, and (iii) determining the scene flow by the neural network based on processing the representation of the coordinates of the first 3D point by the neural network;

determining, for the first pixel, an induced pixel position based on a post-flow 3D point that represents the first 3D point after a displacement according to the scene flow;

determining (i) a pixel flow loss value based on a comparison of the induced pixel position to a position of the second pixel and (ii) a depth loss value based on a comparison of the post-flow 3D point to the second 3D point; and adjusting one or more parameters of one or more of the depth model or the scene flow model based on the pixel flow loss value and the depth loss value.

2. The computer-implemented method of claim 1, wherein the pixel flow loss value and the depth loss value represent an extent of temporal consistency between the first depth image and the second depth image, wherein, after adjusting the one or more parameters, the depth model is configured to generate, based on images in the video, depth images with improved temporal consistency, and wherein the depth model and the scene flow model are specific to the video.

3. The computer-implemented method of claim 1, wherein determining the induced pixel position comprises:
   determining a projection of the post-flow 3D point into an image space of the second image.

4. The computer-implemented method of claim 1, wherein determining the depth loss value comprises:
   determining a representation of the post-flow 3D point in a reference frame associated with the second image, wherein the second 3D point is represented in the reference frame associated with the second image;
   determining (i) a first depth component of the representation of the post-flow 3D point and (ii) a second depth component of the second 3D point; and
   determining the depth loss value based on a comparison of the first depth component and the second depth component.

5. The computer-implemented method of claim 4, wherein determining the depth loss value comprises:
   determining a difference between (i) an inverse of the first depth component and (ii) an inverse of the second depth component.

6. The computer-implemented method of claim 1, wherein:
   the second pixel of the second image is one of a second plurality of pixels of the second image,
   each respective pixel of the second plurality of pixels corresponds to a pixel of a first plurality of pixels of the first image,
   the second plurality of pixels is determined based on a displacement of the first plurality of pixels from the first image to the second image according to the optical flow,
   the first 3D point is one of a plurality of first-image 3D points corresponding to the first plurality of pixels,
   each respective first-image 3D point of the plurality of first-image 3D points is determined based on a respective depth associated with a corresponding pixel of the first plurality of pixels according to the first depth image,
   the second 3D point is one of a plurality of second-image 3D points corresponding to the second plurality of pixels,
   each respective second-image 3D point of the plurality of second-image 3D points is determined based on a respective depth associated with a corresponding pixel of the second plurality of pixels according to the second depth image,
   the post-flow 3D point is one of a plurality of post-flow 3D points, and
   each respective post-flow 3D point of the plurality of post-flow 3D points represents a corresponding first-image 3D point after a corresponding displacement according to the scene flow.

7. The computer-implemented method of claim 6, wherein:
   determining the depth loss value comprises performing, for each respective pixel of the first plurality of pixels, a comparison of the corresponding post-flow 3D point to the corresponding second-image 3D point.

8. The computer-implemented method of claim 6, wherein:
   determining the induced pixel position comprises determining, for each respective pixel of the first plurality of pixels, a corresponding induced pixel position based on the corresponding post-flow 3D point, and
   determining the pixel flow loss value comprises performing, for each respective pixel of the first plurality of pixels, a comparison of the corresponding induced pixel position to a position of the corresponding pixel of the second plurality of pixels.

9. The computer-implemented method of claim 1, further comprising:
   determining an occlusion mask corresponding to the first image and indicating an unoccluded region of the first image that is visible in the first image and in the second image; and
   selecting, based on the occlusion mask, the first pixel from the unoccluded region of the first image.

10. The computer-implemented method of claim 1, wherein the depth model comprises a convolutional neural network that has been pre-trained to generate depth images using a training data set that includes a plurality of pairs of (i) a respective monoscopic training image and (ii) a corresponding ground-truth depth image, and wherein the neural network of the scene flow model has been randomly initialized.

11. The computer-implemented method of claim 1, wherein determining the scene flow further comprises (i) providing a time value associated with the first depth image as input to the scene flow model, (ii) processing the time value by the scene flow model, and (iii) determining the scene flow by the scene flow model based on processing the time value by the neural network.

12. The computer-implemented method of claim 1, further comprising:
   performing a plurality of training iterations, wherein each respective training iteration of the plurality of training iterations comprises determining respective instances of the first depth image, the second depth image, the first depth, the second depth, the scene flow, the first 3D point, the second 3D point, the post-flow 3D point, the induced pixel position, the pixel flow loss value, and the depth loss value, wherein, during an initial sequence of training iterations of the plurality of training iterations, one or more parameters of the scene flow model are adjusted while parameters of the depth model are kept constant, and wherein, during a subsequent sequence of training iterations of the plurality of training iterations, one or more parameters of the scene flow model are adjusted and one or more parameters of the depth model are adjusted.

13. The computer-implemented method of claim 1, wherein the scene flow is a first scene flow, wherein the second image is subsequent to and consecutive with the first image, wherein a third image of the video is subsequent to and consecutive with the second image, and wherein the computer-implemented method further comprises:
- determining, by the scene flow model and based on the post-flow 3D point, a second scene flow representing an additional 3D motion of the post-flow 3D point between the second image and the third image; and
- determining a scene flow velocity loss value based on a comparison of the first scene flow and the second scene flow, wherein the one or more parameters are adjusted further based on the scene flow velocity loss value.

14. The computer-implemented method of claim 1, further comprising:
- determining a static region mask corresponding to the first image and indicating a static region of the first image that does not move relative to a world reference frame; and
- determining a static region loss value based on scene flow values associated with the static region of the first image, wherein the one or more parameters are adjusted further based on the static region loss value.

15. The computer-implemented method of claim 1, wherein the second image is subsequent to and consecutive with the first image, and wherein the computer-implemented method further comprises:
- obtaining a third image from the video and an additional optical flow between the first image and the third image, wherein the third image is separated from the first image by one or more intermediate images of the video;
- determining that a third pixel of the third image corresponds to a displacement of the first pixel from the first image to the third image according to the additional optical flow;
- determining, by the depth model, a third depth image based on the third image;
- determining, based on the third depth image, a third depth associated with the third pixel;
- determining a third 3D point based on the third depth associated with the third pixel;
- determining, by the scene flow model, an additional scene flow representing a 3D motion of the first 3D point between the first image and the third image;
- determining, for the first pixel, an additional induced pixel position based on an additional post-flow 3D point that represents the first 3D point after an additional displacement according to the additional scene flow; and
- determining (i) the pixel flow loss value further based on a comparison of the additional induced pixel position to a position of the third pixel and (ii) the depth loss value further based on a comparison of the additional post-flow 3D point to the third 3D point.

16. The computer-implemented method of claim 15, wherein determining the additional scene flow comprises:
- determining, for each respective intermediate image of the one or more intermediate images that separate the third image from the first image, a corresponding intermediate post-flow 3D point that represents the first 3D point after one or more displacements according to one or more preceding scene flows determined for one or more preceding images;
- determining, by the scene flow model and for each respective intermediate image, a corresponding scene flow based on the corresponding intermediate post-flow 3D point; and
- determining the additional scene flow based on a sum of the corresponding scene flow of each respective intermediate image of the one or more intermediate images.

17. The computer-implemented method of claim 1, further comprising:
- determining, based on the video, first camera parameters associated with the first image and second camera parameters associated with the second image, wherein the first 3D point is determined based on the first camera parameters, and wherein the second 3D point and the induced pixel position are each determined based on the second camera parameters.

18. The computer-implemented method of claim 1, further comprising:
- after adjusting the one or more parameters, determining, by the depth model, a plurality of depth images based on a corresponding plurality of images of the video; and
- based on the plurality of depth images, modifying one or more images of the corresponding plurality of images to insert a depth-based effect into the video.

19. A system comprising:
- a processor; and
- a non-transitory computer-readable medium having stored thereon instructions that, when executed by the processor, cause the processor to perform operations comprising:
  - obtaining a first image from a video, a second image from the video, and an optical flow between the first image and the second image;
  - determining that a second pixel of the second image corresponds to a displacement of a first pixel of the first image to the second image according to the optical flow;
  - determining, by a depth model, (i) a first depth image based on the first image and (ii) a second depth image based on the second image;
  - determining (i), based on the first depth image, a first depth associated with the first pixel and (ii), based on the second depth image, a second depth associated with the second pixel;
  - determining (i) a first three-dimensional (3D) point based on the first depth associated with the first pixel and (ii) a second 3D point based on the second depth associated with the second pixel;
  - determining, by a scene flow model comprising a neural network and based on the first 3D point, a scene flow representing a 3D motion of the first 3D point between the first image and the second image, wherein determining the scene flow comprises: (i) providing a representation of coordinates of the first 3D point as input to the neural network, (ii) processing the representation of the coordinates of the first 3D point by the neural network, and (iii) determining the scene flow by the neural network based on processing the representation of the coordinates of the first 3D point by the neural network;
  - determining, for the first pixel, an induced pixel position based on a post-flow 3D point that represents the first 3D point after a displacement according to the scene flow;
  - determining (i) a pixel flow loss value based on a comparison of the induced pixel position to a position of the second pixel and (ii) a depth loss value based on a comparison of the post-flow 3D point to the second 3D point; and adjusting one or more parameters of one or more of the depth model or the scene flow model based on the pixel flow loss value and the depth loss value.

20. A non-transitory computer-readable medium having stored thereon instructions that, when executed by a computing device, cause the computing device to perform operations comprising:

obtaining a first image from a video, a second image from the video, and an optical flow between the first image and the second image;

determining that a second pixel of the second image corresponds to a displacement of a first pixel of the first image to the second image according to the optical flow;

determining, by a depth model, (i) a first depth image based on the first image and (ii) a second depth image based on the second image;

determining (i), based on the first depth image, a first depth associated with the first pixel and (ii), based on the second depth image, a second depth associated with the second pixel;

determining (i) a first three-dimensional (3D) point based on the first depth associated with the first pixel and (ii) a second 3D point based on the second depth associated with the second pixel;

determining, by a scene flow model comprising a neural network and based on the first 3D point, a scene flow representing a 3D motion of the first 3D point between the first image and the second image, wherein determining the scene flow comprises: (i) providing a representation of coordinates of the first 3D point as input to the neural network, (ii) processing the representation of the coordinates of the first 3D point by the neural network, and (iii) determining the scene flow by the neural network based on processing the representation of the coordinates of the first 3D point by the neural network;

determining, for the first pixel, an induced pixel position based on a post-flow 3D point that represents the first 3D point after a displacement according to the scene flow;

determining (i) a pixel flow loss value based on a comparison of the induced pixel position to a position of the second pixel and (ii) a depth loss value based on a comparison of the post-flow 3D point to the second 3D point; and adjusting one or more parameters of one or more of the depth model or the scene flow model based on the pixel flow loss value and the depth loss value.

* * * * *